(12) United States Patent
Shibata (10) Patent No.: US 12,319,197 B2
(45) Date of Patent: Jun. 3, 2025

(54) VEHICLE PROJECTION DEVICE

(71) Applicant: KOITO MANUFACTURING CO., LTD., Tokyo (JP)

(72) Inventor: Yuichi Shibata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 72 days.

(21) Appl. No.: 18/040,219

(22) PCT Filed: Jul. 9, 2021

(86) PCT No.: PCT/JP2021/025948
§ 371 (c)(1),
(2) Date: Feb. 1, 2023

(87) PCT Pub. No.: WO2022/030181
PCT Pub. Date: Feb. 10, 2022

(65) Prior Publication Data
US 2023/0271548 A1    Aug. 31, 2023

(30) Foreign Application Priority Data
Aug. 5, 2020   (JP) .................. 2020-132902

(51) Int. Cl.
*B60Q 1/50*    (2006.01)
*B60Q 1/22*    (2006.01)

(52) U.S. Cl.
CPC .............. *B60Q 1/50* (2013.01); *B60Q 1/22* (2013.01); *B60Q 1/543* (2022.05); *B60Q 2400/50* (2013.01)

(58) Field of Classification Search
CPC . B60Q 1/50; B60Q 1/22; B60Q 1/543; B60Q 2400/50
See application file for complete search history.

(56) References Cited

U.S. PATENT DOCUMENTS

| | | |
|---|---|---|
| 7,095,318 B1 * | 8/2006 | Bekhor .................. B60Q 1/503 340/464 |
| 7,791,465 B1 * | 9/2010 | El-Massry ............. B60Q 1/381 340/478 |
| 9,567,102 B1 * | 2/2017 | Ross .................... G01C 21/365 |

(Continued)

FOREIGN PATENT DOCUMENTS

| | | |
|---|---|---|
| JP | 2014-144725 A | 8/2014 |
| JP | 2018-149820 A | 9/2018 |

(Continued)

OTHER PUBLICATIONS

Written Opinion for PCT/JP2021/025948, dated Sep. 7, 2021.
International Search Report for PCT/JP2021/025948, dated Sep. 7, 2021.

*Primary Examiner* — Curtis J King
(74) *Attorney, Agent, or Firm* — Sughrue Mion, PLLC (57) ABSTRACT

A projected display with improved visibility and understandability of a vehicle behavior. A vehicle projection device includes a projector that forms a projected image on a road surface; and a control unit. The control unit causes the projector to perform flashing projection of the projected image in a first period from start of projection, and causes the projector to perform sequential projection of the projected image in response to transition from the first period to a second period.

4 Claims, 5 Drawing Sheets

(56) References Cited

U.S. PATENT DOCUMENTS

| | | | | |
|---|---|---|---|---|
| 9,827,901 | B1* | 11/2017 | Thompson | G03B 21/2053 |
| 10,134,280 | B1* | 11/2018 | You | B60Q 1/525 |
| 10,271,399 | B1* | 4/2019 | Ekladyous | H05B 45/20 |
| 2004/0041983 | A1* | 3/2004 | Bleiner | B60Q 1/52 353/13 |
| 2004/0207519 | A1* | 10/2004 | Tracy | B60Q 1/34 340/467 |
| 2007/0102214 | A1* | 5/2007 | Wittorf | G06V 20/58 180/167 |
| 2007/0290823 | A1* | 12/2007 | Watanabe | B60Q 1/2665 348/148 |
| 2009/0013922 | A1* | 1/2009 | Lin | B60Q 1/44 116/28 R |
| 2010/0017111 | A1* | 1/2010 | Stefani | G01C 21/365 353/121 |
| 2012/0044090 | A1* | 2/2012 | Kahler | B60Q 1/245 340/905 |
| 2014/0028980 | A1* | 1/2014 | Othmer | G01C 21/365 353/14 |
| 2015/0138817 | A1* | 5/2015 | Salter | B60Q 1/46 362/510 |
| 2015/0194053 | A1* | 7/2015 | Jensen | B60Q 1/442 340/944 |
| 2015/0228195 | A1* | 8/2015 | Beaurepaire | B60Q 1/547 340/907 |
| 2016/0207443 | A1* | 7/2016 | Widdowson | B60Q 1/0011 |
| 2017/0028902 | A1* | 2/2017 | Diaz | B60Q 1/525 |
| 2017/0144591 | A1* | 5/2017 | Yatsu | H04N 9/3185 |
| 2017/0182934 | A1* | 6/2017 | Arita | B60Q 1/545 |
| 2017/0203685 | A1* | 7/2017 | Hirai | B60Q 1/0023 |
| 2017/0217361 | A1* | 8/2017 | Miller | H05B 47/11 |
| 2017/0232886 | A1* | 8/2017 | Dellock | B60R 1/1207 362/510 |
| 2017/0240096 | A1* | 8/2017 | Ross | G05D 1/0212 |
| 2017/0240098 | A1* | 8/2017 | Sweeney | B60Q 1/5035 |
| 2017/0246983 | A1* | 8/2017 | Canonne | B60Q 1/085 |
| 2017/0253177 | A1* | 9/2017 | Kawamata | B60Q 1/249 |
| 2017/0255093 | A1* | 9/2017 | Fujita | G01S 13/931 |
| 2017/0267167 | A1* | 9/2017 | Sakata | B60Q 1/247 |
| 2018/0004020 | A1* | 1/2018 | Kunii | H04N 9/3179 |
| 2018/0056854 | A1* | 3/2018 | Kunii | G01S 17/04 |
| 2018/0072220 | A1* | 3/2018 | Yan | G08G 1/162 |
| 2018/0086254 | A1* | 3/2018 | Morel | B60Q 1/04 |
| 2018/0086262 | A1* | 3/2018 | Morel | G06V 10/60 |
| 2018/0090011 | A1* | 3/2018 | Morel | B60Q 1/545 |
| 2018/0093607 | A1* | 4/2018 | Omanovic | B60Q 1/34 |
| 2018/0118099 | A1* | 5/2018 | Kunii | B60Q 1/54 |
| 2018/0229643 | A1* | 8/2018 | Frimpong | G03B 21/206 |
| 2018/0238512 | A1* | 8/2018 | Courcier | F21S 41/321 |
| 2018/0251064 | A1* | 9/2018 | Albou | G06F 3/013 |
| 2018/0257547 | A1* | 9/2018 | Suzuki | B60Q 1/547 |
| 2018/0257548 | A1* | 9/2018 | Suzuki | B60Q 1/04 |
| 2018/0260182 | A1* | 9/2018 | Suzuki | B60Q 1/547 |
| 2018/0261081 | A1* | 9/2018 | Suzuki | B60Q 1/525 |
| 2018/0319325 | A1* | 11/2018 | Tatara | B60Q 1/2696 |
| 2018/0328564 | A1* | 11/2018 | Albou | F21S 43/31 |
| 2018/0334089 | A1* | 11/2018 | Huang | B60Q 5/006 |
| 2019/0051184 | A1* | 2/2019 | Lahav | G01S 13/931 |
| 2019/0322209 | A1* | 10/2019 | Sugiyama | F21S 43/26 |
| 2020/0070716 | A1* | 3/2020 | Sakata | B60Q 1/50 |
| 2020/0114812 | A1* | 4/2020 | Imaishi | B60Q 1/346 |
| 2021/0043013 | A1* | 2/2021 | Tatara | B60Q 1/18 |
| 2021/0046864 | A1* | 2/2021 | Elgrably | B60Q 1/324 |
| 2021/0264787 | A1* | 8/2021 | Gordon | B60Q 1/46 |
| 2022/0221123 | A1* | 7/2022 | Okubo | F21S 43/14 |
| 2022/0341560 | A1* | 10/2022 | Shibata | B60Q 1/381 |
| 2022/0388445 | A1* | 12/2022 | Guirguis | B60Q 1/38 |
| 2023/0003358 | A1* | 1/2023 | Kang | F21S 41/40 |
| 2023/0041578 | A1* | 2/2023 | Hamamoto | F21S 43/50 |
| 2023/0166652 | A1* | 6/2023 | Mouri | B60Q 1/34 340/468 |
| 2024/0059214 | A1* | 2/2024 | Suzuki | B60Q 1/381 |
| 2024/0065349 | A1* | 2/2024 | Watson | A41D 13/01 |
| 2024/0109478 | A1* | 4/2024 | Mason | B60Q 1/507 |
| 2024/0157869 | A1* | 5/2024 | Ching | B60Q 1/38 |
| 2024/0253558 | A1* | 8/2024 | Washi | B60Q 1/381 |

FOREIGN PATENT DOCUMENTS

| | | |
|---|---|---|
| WO | 2016/027315 A1 | 2/2016 |
| WO | 2018/138842 A1 | 8/2018 |

\* cited by examiner

FIG. 2

NORMAL PROJECTION

FLASHING PROJECTION

SEQUENTIAL PROJECTION

VEHICLE PROJECTION DEVICE

CROSS REFERENCE TO RELATED APPLICATIONS

This application is a National Stage of International Application No. PCT/JP2021/025948 filed Jul. 9, 2021, claiming priority based on Japanese Patent Application No. 2020-132902 filed Aug. 5, 2020.

TECHNICAL FIELD

The present invention relates to vehicle projection devices, and more particularly to control of a projected image.

BACKGROUND ART

A technique of projecting and displaying various kinds of information on the road surface is known as a vehicle projection device. Patent Document 1 below discloses a device including display pattern projecting means for projecting a display pattern corresponding to the current situation of a vehicle on the road surface.

PRIOR ART DOCUMENT

Patent Document

[Patent Document 1] Japanese Unexamined Patent Application Publication No. 2014-144725 (JP 2014-144725 A)

SUMMARY OF THE INVENTION

Problem to Be Solved by the Invention

Vehicles are equipped with various lights for indicating vehicle's behaviors, such as backup lights indicating backing-up of the vehicle and turn signal lights indicating a right or left turn of the vehicle. However, since only the relevant light(s) turns on, surrounding pedestrians etc. may not notice unless they pay attention to the area(s) around the light(s). Therefore, mounting a projection device on the vehicle and displaying a projected image on the road surface etc. can be considered useful in making pedestrians etc. aware of the vehicle's behavior even when they are not looking at the area(s) around the vehicle's light(s). However, merely displaying (drawing) a projected image on the road surface is not enough to make it easier for pedestrians etc. to notice the projected image or to make the pedestrians etc. understand the vehicle's behavior.

It is therefore an object of the present invention to implement a projection display that is noticeable to pedestrians etc. around a vehicle and that makes it easier for them to recognize the vehicle's behavior.

Means for Solving the Problem

A vehicle projection device according to the present invention includes: a projector that forms a projected image on a road surface; and a control unit that causes the projector to perform flashing projection of the projected image in a first period from start of projection, and that causes the projector to perform sequential projection of the projected image in response to transition from the first period to a second period. For example, the first period is determined according to a gear position of the vehicle or a driver's operation, and flashing display of the projected image is provided. When it is determined that the second period following the first period has started, the flashing projection is switched to the sequential projection. The sequential projection refers to projection in which images are sequentially displayed.

In the above vehicle projection device, the projector may project and display the projected image of backing-up of a vehicle on the road surface behind the vehicle. For example, the projected image is projected on the road surface behind the vehicle when a shift position is in a reverse position.

In the above vehicle projection device, the first period may be a period from when the shift position of the vehicle is shifted to the reverse position until a predetermined time elapses, and the second period may be a period during which the shift position is held in the reverse position after the elapse of the predetermined time. In the period after the shift position is shifted to the reverse position, the projection is switched from the flashing projection to the sequential projection as the time elapses.

In the above vehicle projection device, the first period may be a period from when a shift position of the vehicle is shifted to the reverse until the vehicle starts to back up, and the second period may be a period during which the shift position is held in the reverse position after the vehicle started to back up. In the period after the shift position is shifted to the reverse position, the projection is switched from the flashing projection to the sequential projection when the vehicle actually starts backing up.

In the above vehicle projection device, the sequential projection may be an operation of repeating projection so as to sequentially increase the number of projected images of a predetermined shape from zero to a maximum number in a direction toward a rear of the vehicle. For example, the projected image of the predetermined shape may be a marking indicating backing-up, and the number of such markings is increased in the direction toward the rear.

Effects of the Invention

According to the present invention, the flashing projection that is noticeable even with human peripheral vision is performed in the first period, so that pedestrians etc. around the vehicle can easily notice the projection. After that, the sequential projection that allows the pedestrians etc. to easily understand the meaning of the road surface display is performed in the second period, so that the pedestrians etc. can more easily recognize the vehicle's behavior when they pay attention to it.

MODES FOR CARRYING OUT THE INVENTION

Figure 1:
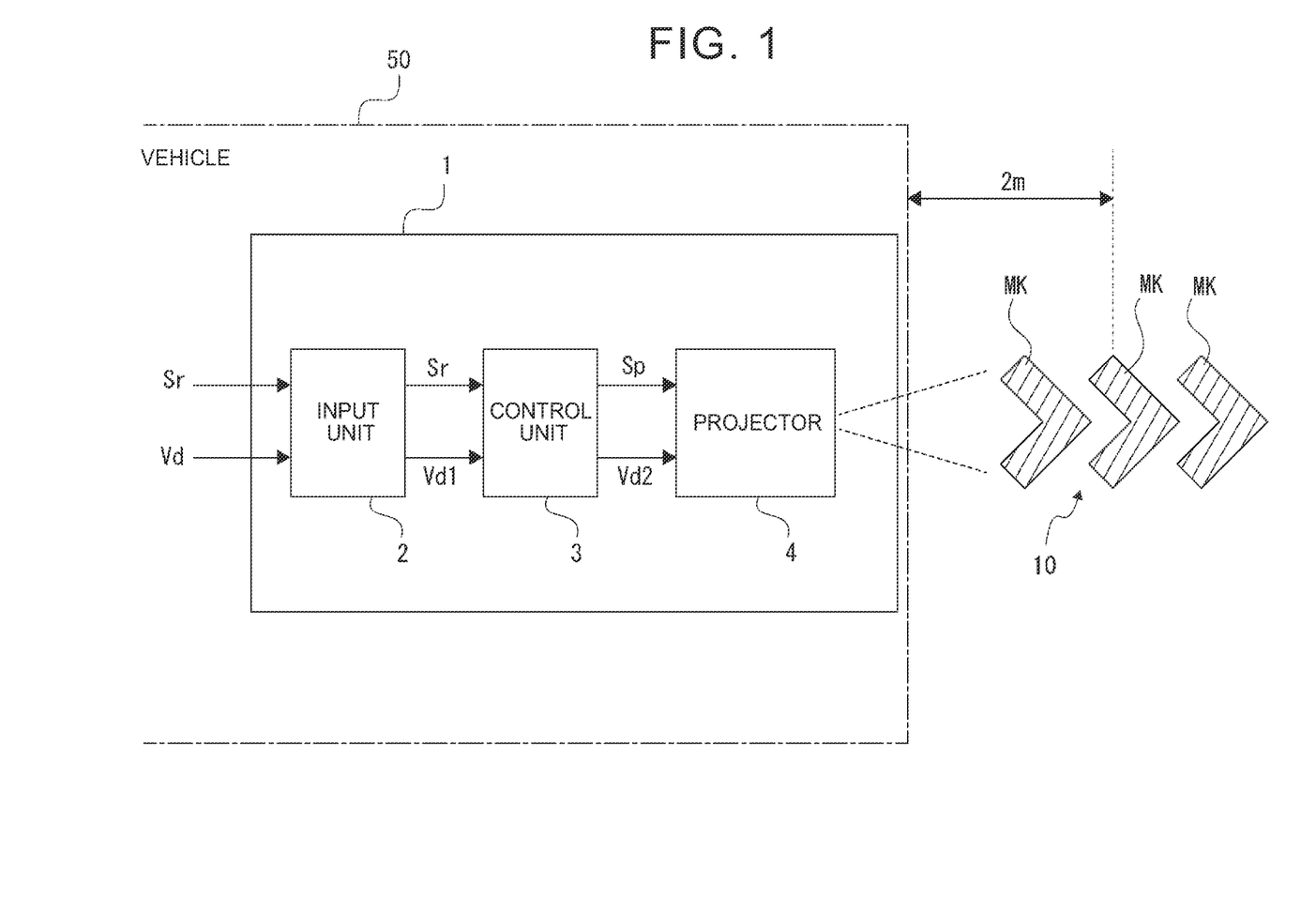
FIG. 1 is a block diagram of a vehicle projection device of an embodiment of the present invention.

Hereinafter, an embodiment will be described with reference to the drawings. FIG. 1 shows an example of the configuration of a vehicle projection device 1.

The vehicle projection device 1 of the embodiment is a device that displays, for example, a projected image 10 indicating backing-up of a vehicle 50 on the road surface behind the vehicle 50. Therefore, the vehicle projection device 1 is mounted on the rear side of the body of the vehicle 50 so that the vehicle projection device 1 can project display toward the area behind the vehicle 50. For example, the vehicle projection device 1 can be placed in the middle part of the rear surface of the body of the vehicle 50, or can be placed together with a turn signal light, a backup light, a brake light, etc. within a so-called rear combination lamp assembly.

In the case where the vehicle projection device 1 is mounted in a rear combination lamp assembly, the vehicle projection device 1 may be mounted in both right and left rear combination lamp assemblies. Both vehicle projection devices 1 may be operated to project an image on the road surface, or only one of the vehicle projection devices 1 may be operated. Alternatively, the vehicle projection device 1 may be mounted in either the right or left rear combination lamp assembly. The vehicle projection device 1 may not be mounted in the other combination lamp assembly, or a dummy vehicle projection device may be mounted in the other combination lamp assembly.

The vehicle projection device 1 is a device that provides display indicating backing-up of the vehicle 50, like the backup lights (also called reversing lights or backing lights). Projecting display on the road surface by the vehicle projection device 1 in addition to turning on the backup lights makes it easier for surrounding pedestrians etc. to be aware of backing up of the vehicle.

The vehicle projection device 1 includes an input unit 2, a control unit 3, and a projector 4. The input unit 2 receives a signal Sr and a power supply voltage Vd from the vehicle 50. The signal Sr is, for example, a signal that is sent from an electronic control unit (ECU) in the vehicle 50 and that indicates various states of the vehicle 50. The signal Sr can be a signal indicating that the shift position is in reverse position (hereinafter referred to as "R position"). The signal Sr can also be a signal indicating that the vehicle 50 has started backing up.

The power supply voltage Vd is a driving power supply voltage for the vehicle projection device 1 supplied through a battery and power supply system of the vehicle 50. The power supply voltage Vd is converted to a power supply voltage Vd1 for the control unit 3 and a power supply voltage Vd2 for the projector 4 by, for example, a DC-to-DC converter in the input unit 2.

The control unit 3 is composed of, for example, a microcomputer including a central processing unit (CPU), a read-only memory (ROM), a random access memory (RAM), a flash memory, etc. The control unit 3 receives the signal Sr via the input unit 2, and thus detects the shift position. The control unit 3 then outputs, through a process that will be described later, a control signal Sp that controls the projection operation of the projector 4.

The projector 4 projects a predetermined image on the road surface as instructed by the control signal Sp from the control unit 3. The projector 4 projects a character, figure, pattern, etc. on the ground so that surrounding people such as pedestrians and drivers of other vehicles can recognize the information displayed by projection.

In the case of the present embodiment, for example, the projected image 10 indicating backing-up of the vehicle 50 is displayed on the road surface behind the vehicle 50, as described above. For example, three rearward-pointing markings MK (it should be understood that "three" is merely an example) are displayed as a shape of the projected image 10 that easily makes aware of backing-up of the vehicle 50. For example, the projected position of the center of the middle one of the three markings MK is about 2 m behind the vehicle 50.

The projector 4 thus displays the projected image 10 on the road surface and also makes surrounding people recognize the shape etc. of the projected image 10. Therefore, the projection operation is performed with relatively uniform brightness so that the shape, pattern, etc. as one unit of projected image (e.g., one marking MK) is clearly displayed. In this respect, it is different from vehicle lights such as backup lights with a relatively low requirement for surface illuminance uniformity.

Figure 2:
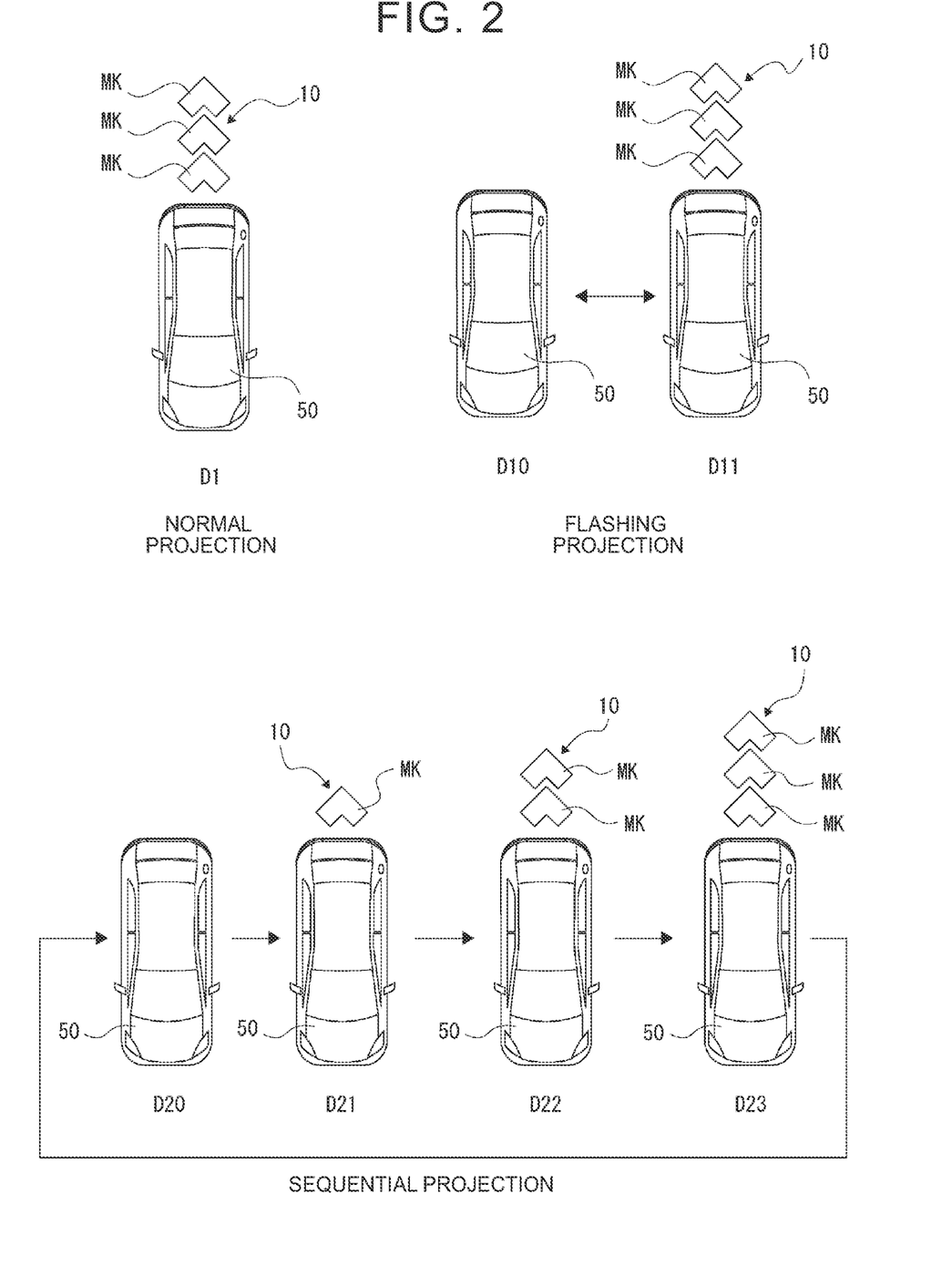
FIG. 2 illustrates projection display of the embodiment.

FIG. 2 shows examples of the projection operation that is performed by the vehicle projection device 1 described above when the vehicle backs up. The examples shown herein are normal projection, flashing projection, and sequential projection. The figure shows the rear of the vehicle 50 and the states of the projected images 10 projected on the road surface behind the vehicle 50.

In the normal projection, the projected image 10 is projected as shown by a projection operation D1. For example, the three markings MK arranged in a row are continuously projected and displayed while, for example, in reverse position.

In the flashing projection, projection operations D10 and D11 are repeated at a frequency of, for example, about 1 Hz while in reverse position. The projection operation D10 refers to the state in which no image is projected, and the projection operation D11 refers to the state in which the projected image 10 of the three markings MK arranged in a row is projected and displayed. The projected image 10 therefore looks like it is flashing.

In the sequential projection, projection operations D20, D21, D22, and D23 are sequentially repeated at a frequency of, for example, about 1 Hz while in reverse position. The projection operation D20 refers to the state in which no image is projected, the projection operation D21 refers to the state in which one marking MK is projected and displayed, the projection operation D22 refers to the state in which the second marking MK is also projected and displayed in addition to the first marking MK, and the projection operation D23 refers to the state in which all of the three markings MK are projected and displayed. As a result, the projected image 10 looks like the marking MK repeatedly extends backward.

The experimental results of these three types of display will be described. For example, in the experiment, the projected image 10 is projected and displayed so that the middle one of the three markings MK is located on the road surface that is assumed to be 2 m behind the vehicle. Assuming that a vehicle backs up across a sidewalk, a subject is placed at such a position that he or she sees the row of markings MK from the side. In other words, it is assumed that a person is walking on the sidewalk. The distance from the row of the markings MK to the subject was 5 m. Subjects were assumed to be people walking normally while looking ahead (normal pedestrians) and people walking while looking at a smartphone etc. (pedestrians not paying attention).

The ambient illuminance was set to the following values: 1000 [lx] equivalent to the brightness at dusk, 200 [lx] equivalent to an indoor parking lot, 50 [lx] equivalent to a bright intersection at night, and 10 [lx] equivalent to a dark intersection at night. An evaluation in terms of whether the subjects "noticed" or "did not notice" the projected image 10 was carried out at various luminance contrasts that are a parameter of the brightness of the display projected by the projector 4.

Figure 3:
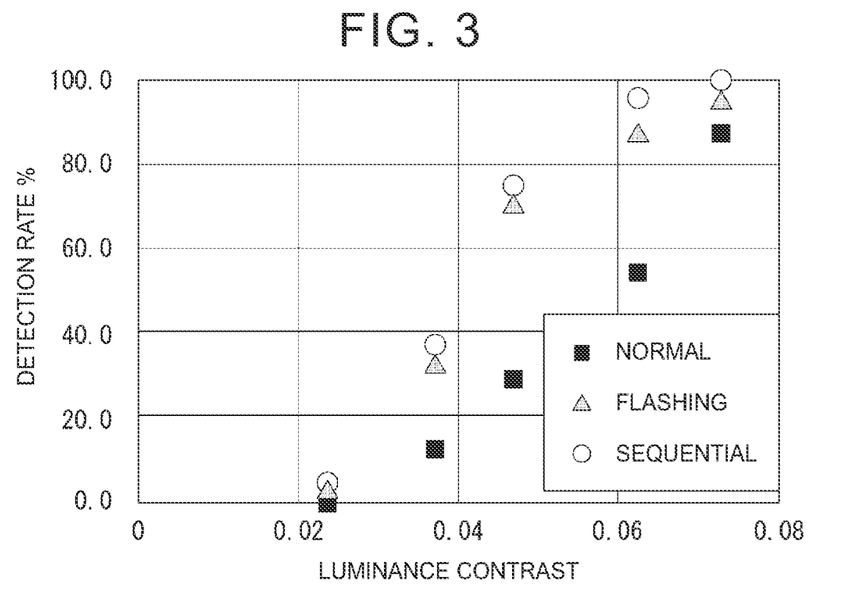
FIG. 3 illustrates the experimental results regarding pedestrians' awareness.
Figure 4:
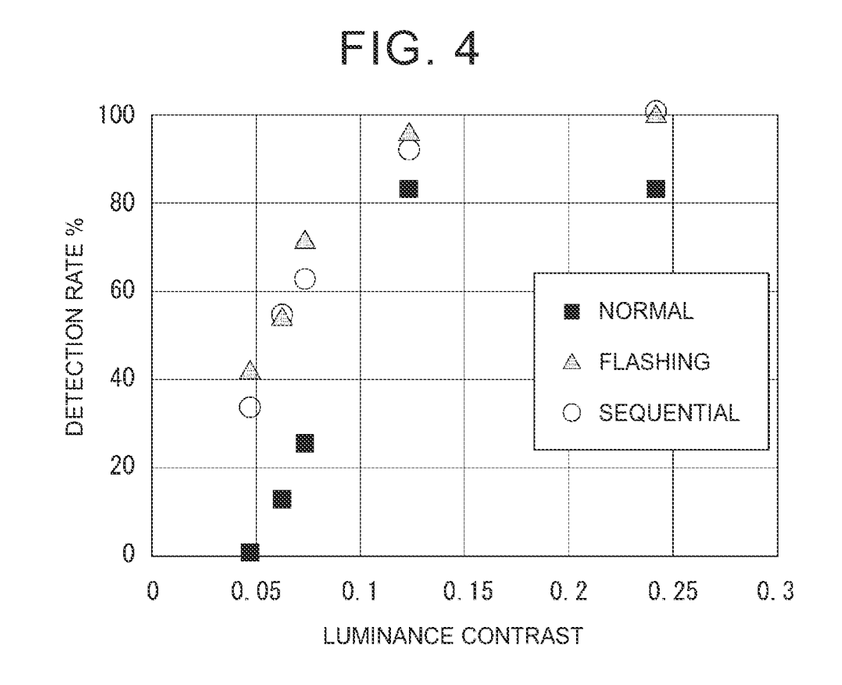
FIG. 4 illustrates the experimental results regarding pedestrians' awareness.

As a result of the experiment, there was no significant difference depending on the difference in ambient illuminance. FIGS. 3 and 4 show the results for the normal pedestrians and the pedestrians not paying attention when the ambient illuminance was 1000 [lx]. In FIGS. 3 and 4, the ordinate represents the detection rate [%], and the abscissa represents the luminance contrast. The scale of the abscissa is different between these figures due to the measured values. The detection rate is the rate at which the subjects noticed the projected image 10. Each figure shows the results for the normal projection, the flashing projection, and the sequential projection.

The following can be said from the results. First, for both the normal pedestrians and the pedestrians not paying attention, the detection rate of the normal projection is the lowest, and the detection rates of the flashing projection and the sequential projection are high and substantially the same. The p-values for the flashing projection and the sequential projection are higher than 0.05, and it cannot be said which is more noticeable. Although it cannot be read from FIGS. 3 and 4, the average values of the experimental results were often higher for the flashing projection than for the sequential projection. The luminance contrast also makes no significant difference in tendency that the flashing projection and the sequential projection are more noticeable than the normal projection. Although the pedestrians not paying attention tend to be less likely to notice than the normal pedestrians unless the luminance contrast was high, even the pedestrians not paying attention are more likely to notice the flashing projection and the sequential projection than the normal projection. This can be presumed to be because the subjects detected a visual target (projected image 10) with their peripheral vision, i.e., in the area of peripheral vision with fewer pyramidal cells and therefore color did not affect the detection.

Figure 5:
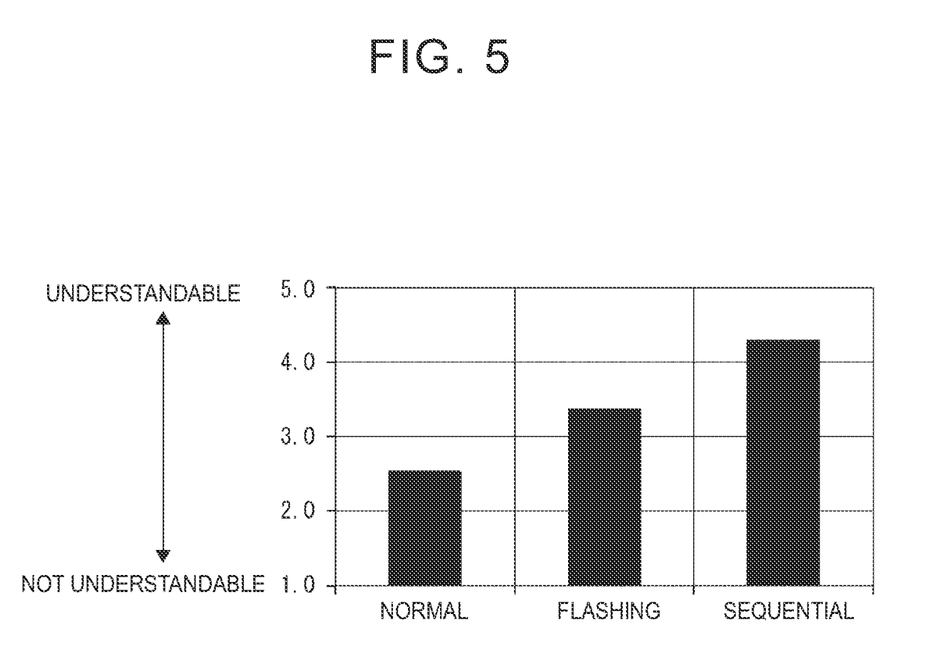
FIG. 5 illustrates the experimental results regarding pedestrians' recognition of a vehicle behavior.

An experiment was also conducted regarding evaluation of the impression of the projected image 10. This is an experiment on whether it is possible to recognize that the projected image 10 indicates backing-up of the vehicle by seeing the projected image 10. The subjects were asked to rate the projected image 10 based on their impression they had of the projected image 10 when they saw it. The evaluation scale was as follows: 1 point means "not understandable," 2 points means "barely understandable," 3 points means "slightly understandable," 4 points means "understandable," and 5 points means "very understandable." The average values of the points of the subjects are shown in FIG. 5. The average values were 2.4348 points for the normal projection, 3.3478 points for the flashing projection, and 4.3478 points for the sequential projection. These were all significant differences (p-values less than 0.01), with the sequential projection being most likely to convey the intention to back up the vehicle, followed by the flashing projection, and the normal projection being relatively less likely to communicate the meaning. In this case, the subjects see the projected image 10 with their central vision. In other words, the results show that the subjects are likely to recognize the intention to back up the vehicle when normally seeing the sequential projection rather than seeing the sequential projection while looking at a smartphone etc.

Figure 6:
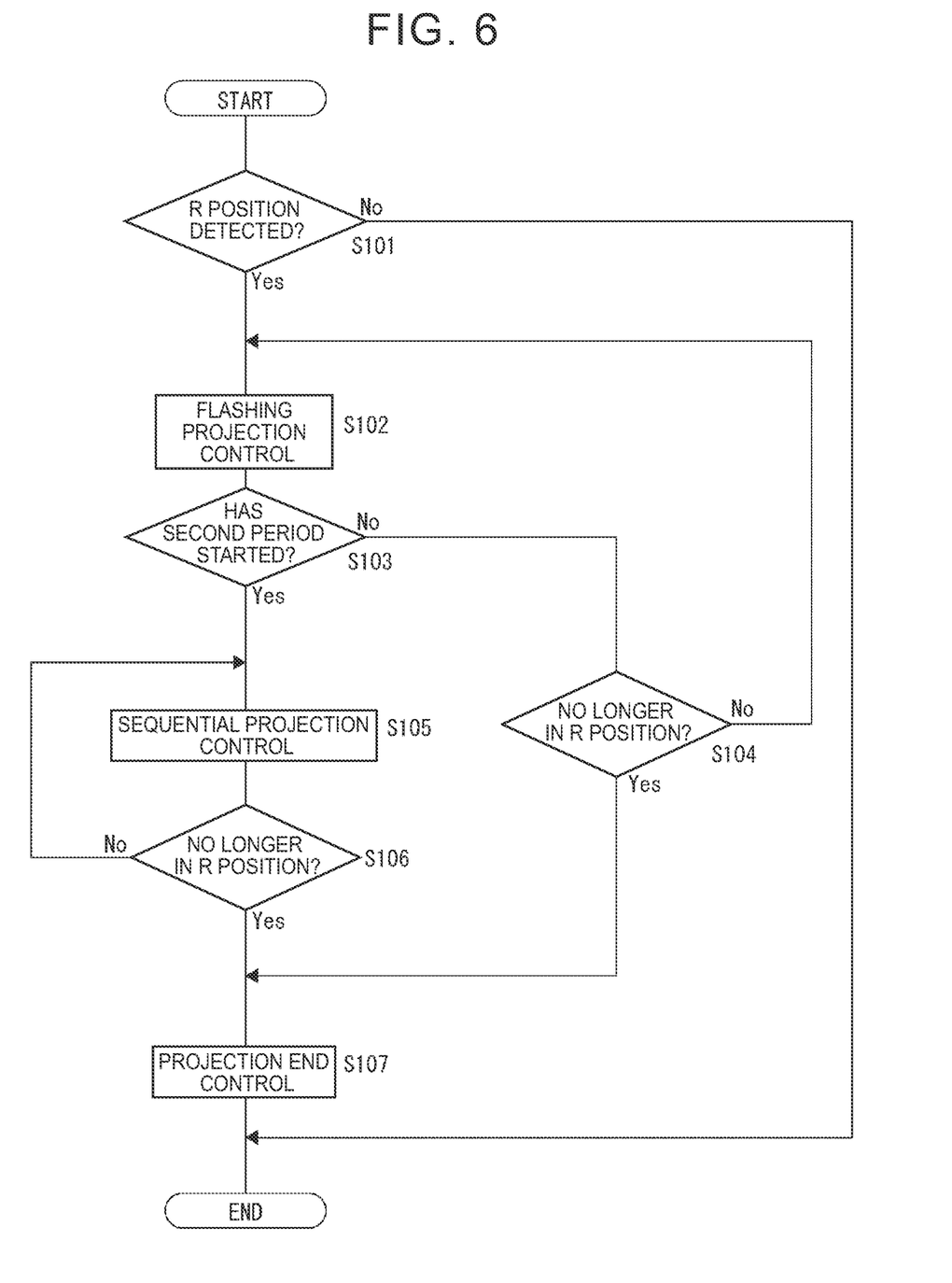
FIG. 6 is a flowchart of projection control of the embodiment.

Based on the above, in the present embodiment, the control unit 3 controls the projection operation of the projector 4 as shown in FIG. 6. This is an example of a process of switching the display mode between first and second periods that are periods during which the projected image 10 is displayed.

In step S101 of FIG. 6, the control unit 3 monitors the signal Sr from the vehicle 50 to determine whether the shift position is currently in R position. When it is determined that the shift position is in R position, the control unit 3 performs step S102 and the subsequent steps. First, in step S102, the control unit 3 causes the projector 4 to perform the flashing projection as projection for the first period.

The control unit 3 makes determinations in steps S103 and S104 while continuing the flashing projection control in step S102. In step S103, the control unit 3 determines whether the second period has started. In step S104, the control unit 3 checks the signal Sr to monitor whether the shift position is no longer in R position. When it is detected, by the time it is determined in step S103 that the second period has started, that the shift position is no longer in R position based on the signal Sr, the process proceeds to step S107, and the control unit 3 controls the projector 4 to end the projection.

When it is detected in step S103 that the second period has started, the control unit 3 proceeds to step S105. An example of the determination as to transition from the first period to the second period will be described later. In step S105, the control unit 3 causes the projector 4 to perform the sequential projection as projection for the second period.

In the second period during which the sequential projection is performed in step S105, the control unit 3 checks the signal Sr in step S106 to monitor whether the shift position is no longer in R position. When it is detected from the signal Sr that the shift position is no longer in R position, the process proceeds to step S107, and the control unit 3 controls the projector 4 to end the projection.

For the above example of the process, two examples of the determination of the second period in step S102 will be described. In the first example, the first period is the period from when the vehicle 50 is shifted to R position until a predetermined time elapses, and the second period is the period during which the vehicle 50 is held in R position (until it is no longer in R position) after the elapse of the predetermined time.

In this case, the control unit 3 starts counting the time when the flashing projection is started in step S102 in response to detection of R position, and determines in step S103 whether the predetermined time has elapsed. When the predetermined time has elapsed, the control unit 3 determines that the second period has started, and switches to the sequential projection in step S105.

In the second example, the first period is the period from when the vehicle 50 is shifted to R position until the vehicle 50 starts to back up, and the second period is the period during which the vehicle 50 is held in R position (until it is no longer in R position) after the vehicle 50 started to back up.

In this case, the control unit 3 monitors in step S103 whether the vehicle has started to back up, based on the signal Sr. When it is detected that the vehicle 50 has started to back up, the control unit 3 determines that the second period has started, and switches to the sequential projection in step S105.

The embodiment described above has the following effects. The vehicle projection device 1 of the embodiment includes: the projector 4 that forms a projected image on the road surface; and the control unit 3 that causes the projector 4 to perform the flashing projection of the projected image 10 in the first period from the start of projection, and that causes the projector 4 to perform the sequential projection of the projected image 10 in response to transition from the first period to the second period. As described above, the flashing projection that is noticeable even with human peripheral vision is performed in the first period, so that pedestrians etc. around the vehicle can easily notice the projected image 10. After that, the sequential projection that allows the pedestrians etc. to easily understand the meaning of the road surface display is performed in the second period, so that the pedestrians etc. can more easily recognize the vehicle's behavior when they pay attention to it. In other words, appropriate displays can be provided to surrounding pedestrians etc. in terms of "awareness" and "recognition of the vehicle's behavior."

In particular, the projector 4 projects and displays a projected image of backing-up of the vehicle on the road surface behind the vehicle. In this way, when the vehicle backs up, display (drawing) can be projected on the road surface so that the pedestrians etc. can easily notice the display and can easily recognize the backing-up behavior.

In one example of the process in FIG. 6, the first period is the period from when the vehicle 50 is shifted to R position until the predetermined time elapses, and the second period is the period during which the vehicle 50 is held in R position after the elapse of the predetermined time. The driver usually starts backing up after shifting to R position. Therefore, when the driver is about to start backing up, the surrounding pedestrians can be alerted by the flashing projection that is highly visible to them even when they are not paying attention. Thereafter, the sequential projection is performed. It is thus easy to notify that the vehicle is backing up.

In another example of the process in FIG. 6, the first period is the period from when the vehicle 50 is shifted to R position until the vehicle starts to back up, and the second period is the period during which the vehicle 50 is held in R position after the vehicle 50 started to back up. When the driver is about to start backing up by shifting to R position, the surrounding pedestrians can be alerted by the flashing projection that is highly visible to them even when they are not paying attention. Subsequently, after the vehicle has actually started to back up, the sequential projection is performed, so that the pedestrians etc. can easily recognize that the vehicle is backing up.

Even when autonomous driving is performed in these two examples, the start of the first period can be detected when the shift position is shifted to R position by automatic control, and the end of the second period can be detected when the shift position is no longer in R position.

The sequential projection in the embodiment is an operation of repeating projection so as to sequentially increase the number of projected images of the shape, that is, the marking MK, from zero to its maximum value (three in the above example) in the direction toward the rear of the vehicle (see FIG. 2). By repeating the pattern in which the number of rearward-pointing markings MK increases in the direction toward the rear of the vehicle 50, the surrounding pedestrians etc. can easily understand that the vehicle 50 is going to back up or is backing up.

The technique of the embodiment, i.e., the technique of causing the projector 4 to perform the flashing projection of the projected image 10 in the first period from the start of projection, and causing the projector 4 to perform the sequential projection of the projected image 10 when the second period starts, can be used in applications other than display indicating backing-up of the vehicle.

For example, turn signal projection indicating a right or left turn of the vehicle 50 may be performed. That is, in addition to causing a turn signal light to flash etc., a projected image 10 serving as a turn signal is displayed on the road surface. In this case, flashing projection of the projected image 10 is performed in the first period, and sequential projection of the projected image 10 is performed in the second period.

Specific examples will be described. When the driver operates a turn signal lever to turn on a turn signal light when stopping at an intersection with traffic lights etc., the control unit 3 causes the projector 4 to perform flashing projection of a projected image 10 indicating a turn on the road surface in the first period. Thereafter, the second period starts when a green light is detected or it is detected that the vehicle 50 has actually started, and the projector 4 is caused to perform sequential projection. In this case, while the vehicle is stopped at the traffic light, the flashing projection is performed to make the pedestrians etc. easily aware of the turn. When the vehicle starts to make a right or left turn, the sequential projection is performed to make the pedestrians etc. easily recognize the right or left turn.

When the vehicle changes lanes, the sequential projection may be performed from the beginning. The intention to change lanes can thus be conveyed early to the following vehicles. In other words, different controls may be performed in the first and second periods or such different controls may not be performed, depending on the situation.

In hazard situations, only flashing projection on the road surface may be performed, or projection may not be performed. This is because flashing hazard lights of the rear combination lamp assemblies can be noticeable enough to the drivers of the following vehicles. Power consumption can be reduced by avoiding unnecessary projection by the projector 4. Since the hazard situations often last longer than the right and left turns, it is particularly suitable in terms of reduction in power consumption to only cause a turn signal light to flash and not to cause the projector 4 to perform projection in the hazard situations.

When leaving a parking lot, a turn signal light may be caused to flash when the turn signal light is turned on in response to the operation of the turn signal lever, and the turn signal light may be switched to a sequential mode according to the steering state or the vehicle's behavior (starting to move).

The projector 4 may perform the flashing projection when the vehicle is stopped with the turn signal light on. The projector 4 may perform the sequential projection when a sensor detects that the vehicle 50 has started moving and while the vehicle is moving with the turn signal light on.

The flashing projection may be performed when the shift position is in neutral (N) position, and the sequential projection may be performed when the shift position is switched to drive (D) position.

The flashing projection may be performed in a situation where the vehicle 50 is moving straight, and the sequential projection may be performed when a steering operation is being performed.

In each of the above examples, in the case of a manually driven vehicle, the flashing projection need only be started when the driver operates the turn signal lever. When cooperating with a sensor, for example, only a turn signal light may flash when the turn signal lever is turned on, the projector 4 may start the flashing projection when the vehicle reaches to a predetermined distance to an intersection etc. where the vehicle is supposed to make a turn, and the projector 4 may start the sequential projection according to the determination as to the steering state. In an autonomous vehicle, the turn signal lever may be automatically turned on when the vehicle reaches a predetermined distance to an intersection etc. where the vehicle is supposed to make a turn.

DESCRIPTION OF REFERENCE SIGNS

1 Vehicle Projection Device
2 Input Unit
3 Control Unit
4 Projector
10 Projected Image
50 Vehicle
MK Marking

The invention claimed is:

1. A vehicle projection device comprising:
a projector that forms a projected image on a road surface; and
a processor that causes the projector to perform flashing projection of the projected image in a first period from start of projection, and that causes the projector to perform sequential projection of the projected image in a second period;
wherein the first period is a period that begins when a shift position of the vehicle is first shifted to a reverse position and ends when a predetermined time period after the vehicle is first shifted to the reverse position elapses, and the second period is a period during which the shift position remains in the reverse position, the second period beginning when the predetermined time period after the vehicle is first shifted to the reverse position elapses.

2. The vehicle projection device according to claim 1, wherein the projector projects and displays the projected image on the road surface behind the vehicle.

3. The vehicle projection device according to claim 1, wherein the sequential projection is an operation of repeating projection so as to sequentially increase the number of projected images of a predetermined shape from zero to a maximum number in a direction toward a rear of a vehicle.

4. The vehicle projection device according to claim 2, wherein the sequential projection is an operation of repeating projection so as to sequentially increase the number of projected images of a predetermined shape from zero to a maximum number in a direction toward a rear of the vehicle.

* * * * *